United States Patent Office 3,598,687
Patented Aug. 10, 1971

3,598,687
LEATHER-LIKE FABRIC
Adjiman Elie, Place de la Mairie, 95 Belloy, France
Filed Dec. 14, 1967, Ser. No. 690,570
Claims priority, application France, Dec. 22, 1966,
88,417
Int. Cl. D03d 27/00; D04h 11/00; D06n 3/00
U.S. Cl. 161—64
26 Claims

ABSTRACT OF THE DISCLOSURE

A leather like material having a support with moisture absorption properties at least equal to those of natural leather. The support is coated with an adhesive, which is inturn coated with leather particles each having thin end portions. The leather particles are fixed to the adhesive by means of the thin end portions. The material is made by electrolstatically flocking the leather particles onto the adhesive coated base.

---

The present invention relates to a material having the properties of leather and to a method of its manufacture from natural and synthetic raw materials.

It is one object of the present invention to produce a material of this kind by a method utilizing natural leather waste.

It is a further object of this invention to produce a material of this kind which can be worked in the same way as natural leather.

It is still another object of the present invention to produce a material having the qualities of natural leather and having exceptional properties of mechanical strength and resistance to wear.

Other objects and advantages of the invention will be brought out in the description which follows below, reference being made to the accompanying drawings, in which.

According to the invention, a support having properties of absorption of moisture at least equal to those of natural leather, is coated with an appropriate adhesive layer on which are deposited particles of leather previously prepared and treated.

In the spaces left free between the particles of leather thus fixed, in certain cases natural, artificial or synthetic fibres may be fixed in the adhesive layer.

According to a particularly advantageous form of embodiment of the invention, a method known as "electrostatic flocking" is employed in the production of the said material.

Figure 1:
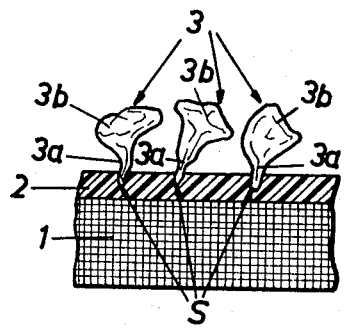
FIG. 1 shows diagrammatically a cross-section of an example of material produced in accordance with the invention.

FIG. 1 shows by way of example in diagrammatic form, a cross-section of a material according to the invention. A support 1 which may be a woven or non-woven product, is coated with a resin, the molecules of which allow water and air to pass between them. This resin is generally of a polyacrylic base.

The support, of which the base material has advantageously a continuous weft in order to increase its mechanical strength, acts like natural leather in sucking-up water and then releasing it after a fairly short period, for example 40 to 60 minutes.

It is also possible to utilize as a support a woven cloth which may furthermore be teazeled.

On this support 1 there is deposited a layer 2 of an appropriate coating, forming a thickness layer on the one hand and an adhesive on the other, for the retention and fixing of the elements which constitute the surface layer, such as for example particles of natural leather and, if so desired, natural, artificial or synthetic textile fibres, etc. The thickness of this layer may vary, for example from 20/100 mm. to 1 mm., depending on the desired properties of the finished product.

This layer is preferably constituted by a microcellular synthetic material with open cells, having a base of polyurethane for example. However, in certain cases, for example for a material intended to serve as soles of shoes, this layer may be of micro-cellular synthetic material with closed cells, having a base of polyvinyl, for example, or again it may be of natural latex or it may be in the form of a thread of compact synthetic material.

In accordance with one preferred form of embodiment of the invention, the surface aspect of the natural leather of the product is obtained by fixing in the adhesive layer 2, particles 3 of previously prepared natural leather. These particles 3 always have a thinned-down or tapered portion of approximately conical shape 3a, hereinafter referred to as the "pointed portion." According to the invention, the particles 3 are fixed in the adhesive by the apices S of their conical portions so that the base portions 3b of these cones, having a relatively large volume and therefore a large base surface, are directed towards the exterior. This method of fixing the particles 3 in the adhesive 2 enables the material according to the invention to be worked by the same methods and with the same machines as those employed for working leather.

The size of these particles 3 varies according to the use contemplated for the finished material and according to its desired final appearance. For finished materials intended to replace leather in its current use, the size of the particles varies between 450 and 600 microns, which corresponds to the mesh of current metallic sieves.

Figure 2:
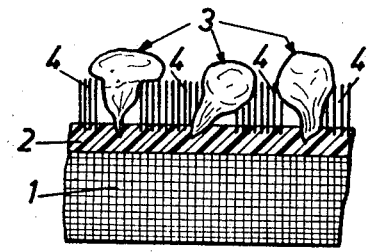
FIG. 2 shows a diagrammatic view in cross-section of another example of material according to the invention.

The applicant has further found by experience that it is particularly advantageous to fix in the adhesive and in the spaces left free between the particles 3 of leather, fibres 4 arranged vertically with respect to the adhesive layer 2 and the support 1 (see FIG. 2).

The utilization of these fibres makes it possible to fill the empty spaces between the particles of natural leather, but also considerably to increase the mechanical strength and the resistance to wear of the finished material, Tests which have been carried out have proved that the mechanical strength and the resistance to wear of the material thus constituted in accordance with the invention, are definitely superior to those of natural leather. Finally, the presence of these fibres gives a sensation of softness to the touch.

These fibres may be natural, artificial or synthetic. Their length is for example from 0.3 to 1 mm., depending on the desired properties of the finished material, and their denier size is chosen in consequence. Fibres of nylon cut to 0.5 mm. in length and having a denier of 1.5 have given excellent results.

The quantity of fibres with respect to the grains is chosen in such manner as to ensure the qualities and appearance of the leather. Experience has shown that a quantity of fibres covering 20% of the surface of the adhesive layer 2 gives excellent results from the point of view of mechanical strength of the assembly and the external appearance obtained. However, depending on the properties of mechanical strength and utilization of the finished material contemplated, the quantity of fibres employed can vary so as to be applied to a fraction of surface of 5 to 40% of the adhesive layer, without thereby substantially modifying the external aspect of the finished product.

In order to obtain the appearance of chrome leather, of the velvet-type of leather, suede finish and the like, it is only necessary to treat the product by rubbing down with emery cloth and/or pumice.

The material forming the object of the invention can be produced following the most varied methods of manufacture. The preferred method of manufacture, however, which appears to offer considerable advantages, comprises the use of a process known as "electrostatic flocking" for the fixing of particles and/or fibres in a layer of adhesive. In fact, following this process, the particles and/or fibres intended to be fixed in a layer of adhesive are introduced into the layer after appropriate treatment and after having passed through an electrostatic field, in which the said particles and/or fibres take-up the preferred position for their fixing in the said layer of adhesive.

Figure 3:
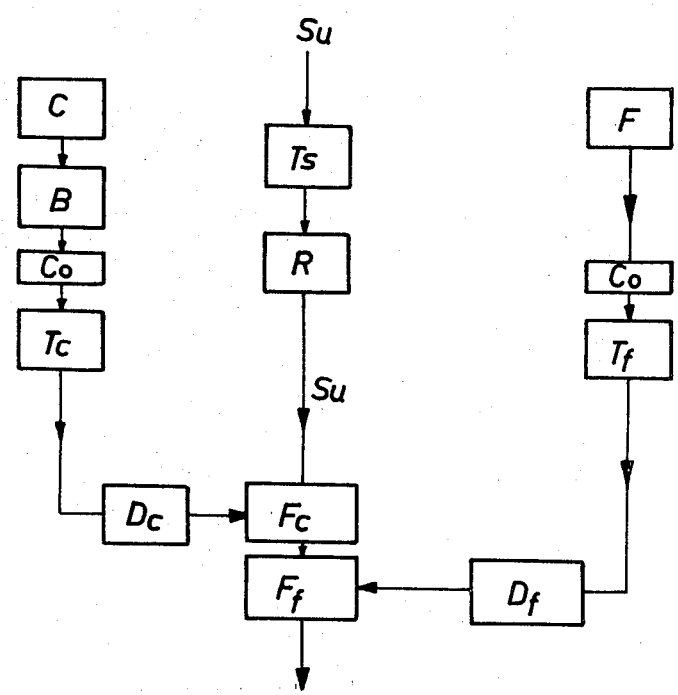
FIG. 3 illustrates an example of the organization of the method according to the invention.

By way of non-limitative example, a method of manufacture of a material according to the invention with a base of leather waste and comprising nylon fibres, will now be described below and illustrated in diagrammatic manner in FIG. 3.

The leather waste is led-in from a storage place C towards a grinder B, in which this waste is converted to particles of the desired granular size. After having passed through a checking device Co, these particles are treated in an appropriate manner in the apparatus, Tc, so as to render them conductive for the purpose of their subsequent passage into an electrostatic field. This treatment may be effected by coating with a derivative of a quaternary amine salt. It is also possible at this stage of the manufacture, to carry out the preliminary or even the final dyeing of the leather particles.

The particles of leather are then conveyed to a sieve-distributor Dc and an electrostatic flocking apparatus Fc, in which they are applied to and fixed on the adhesive layer spread on the support Su previously prepared and also brought into the flocking apparatus by a method of conveyance comprising for example the treatment of the support in a device Ts by a resin with an acrylic base followed by a coating in the apparatus R with a synthetic product with closed cells (polyvinyl chloride) or with open cells (polyurethane for example), or any other natural coating (latex for example) or synthetic coating capable of giving the final product the properties which it is desired to possess.

The shapes of the leather particles are irregular. However, they always have a portion having a relatively large volume which can be compared to the base of a cone, and a portion which becomes progressively thinner and terminates in an apex which may be compared to the apex of a cone. The process of electrostatic flocking enables the particles of leather to be fixed by their apices in the layer of adhesive spread on the support.

The portion of the particles which has a relatively large volume is thus directed towards the exterior. The external surface of the material according to the invention is therefore essentially constituted by natural leather. This makes possible the subsequent working of the material by the same methods and with the same machine as for natural leather.

In certain cases, as has already been stated above, it may be advantageous to fix fibres in the spaces left free between the particles of leather fixed on the support by electrostatic flocking. These fibres may also be fixed by electrostatic flockings in an apparatus Ff after having been conveyed to this apparatus from a storage device F for fibres having the desired length and denier, through a checking device Co, a preliminary or final dyeing apparatus, when desired, an apparatus Tf for oiling the material, and a distributor Df.

The material obtained by this method may subsequently be subjected to a finishing treatment and working like natural leather, namely: rubbing down with emery or pumice, polishing, dyeing, etc. The external appearance of the material thus obtained is that of chrome leather, of velvet-type leather, suede leather or the like.

In order to obtain a material having the external appearance of leather of the "Box" or "smooth calf" type, a surface treatment is carried out, consisting of coating with a synthetic material having closed cells (polyvinyl chloride, for example) or open cells (oplyurethane, for example), the coating being chosen as a function of the desired qualities of the finished product. This finishing coating can be given the desired appearance, grained or smooth, pigmented, etc.

The material and the method for its manufacture have been described above by way of example only, and modifications may be made thereto without thereby departing from the scope of the invention.

What I claim is:

1. A material having the properties of leather comprising a support having moisture absorption properties at least equal to those of natural leather, a microcellular adhesive layer coating said support and particles of leather, each having thin end portions, similar to apices of cones, fixed to said adhesive layer by said thin end portions.

2. A material as claimed in claim 1, in which said support is a woven product coated with an acrylic resin.

3. A material as claimed in claim 1, in which said support is a non-woven product coated with an acrylic resin.

4. A material as claimed in claim 1, in which said support is a teazeled fabric.

5. A material as claimed in claim 1, in which the surface of said material has been subjected to a leather finishing treatment.

6. A material as claimed in claim 1, comprising a finishing coating on the outer surface of the finished product, said coating being constituted by a micro-cellular resin with closed cells so as to give the product a smooth or grained appearance.

7. A material as claimed in claim 1 comprising a finishing coating on the outer surface of the finished product, said coating being constituted by a micro-cellular resin with open cells so as to give the product a smooth or grained appearance.

8. A material according to claim 1 wherein the size of the leather particles varies from about 450 to about 600 microns.

9. A material as defined in claim 1, wherein said microcellular adhesive layer has a thickness of from about 0.2 mm. to 1 mm.

10. A material as claimed in claim 1, in which said micro-cellular coating forming an adhesive layer is of the type with closed cells.

11. A material according to claim 10 wherein the microcellular material is a polyvinyl resin or neutral latex.

12. A material as claimed in claim 1 in which said micro-cellular coating forming an adhesive layer is of the type having open cells.

13. A material according to claim 12 wherein the microcellular material is a polyurethane.

14. A material having the properties of leather, comprising a fabric support, an adhesive layer of the type with open cells coating said support, a number of small leather particles, each having a thin end portion, fixed to said layer forming part of the external surface of said material, and thin cut nylon fibres fixed on the adhesive layer and substantially filling the spaces left free between said leather particles.

15. A material having the properties of leather comprising a support having moisture absorption properties at least equal to those of natural leather, an adhesive layer, which comprises a layer of a microcellular synthetic material coating said support, particles of leather having thin end portions, similar to apices of cones, fixed to said adhesive layer by said thin end portions, and cut fibers in an upright position on portions of the adhesive layer not covered by the leather particles.

16. A material as claimed in claim 15, in which the leather particles and the fibres fixed in said adhesive have been dyed.

17. A material as claimed in claim 15 wherein the fibers have a length of about 0.3 mm to about 1 mm.

18. A material as claimed in claim 15 wherein the cut fibers are nylon fibers.

19. A material as claimed in claim 18 wherein the nylon fibers are about 0.5 mm in length and have a denier of about 1.5.

20. A material as defined in claim 15 wherein the fibers cover from about 5 to about 40% of the adhesive layer.

21. A material as defined in claim 20 wherein the fibers cover about 20% of the surface of the adhesive layer.

22. A method of manufacturing a material having the properties of natural leather comprising electrostatically flocking leather particles, each having a pointed portion, on a support coated with a layer of adhesive of microcellular resin, said flocking being effected in such a manner that the pointed portion of each leather particle is fixed in the adhesive layer, and then flocking fibers in the spaces left free on the support.

23. A method of manufacturing a material having the properties of natural leather, comprising the following successive steps:
(a) grinding leather waste into particles, each having a thin portion or pointed portion; and
(b) electrostatically flocking the leather particles on a support previously treated and coated with a layer of adhesive of microcellular resin, said flocking being effected in such a manner that the pointed portion of each leather particle is fixed in the adhesive layer.

24. A method as claimed in claim 23, and further comprising the additional step of a finishing treatment for the external surface of said material, equivalent to that given to a natural leather and carried out by identical means such as rubbing down with emery or pumice, polishing, and dyeing.

25. A method as claimed in claim 23 and further comprising the supplementary step of a surface treatment by coating with a micro-cellular resin in order to give said material a leather like appearance.

26. A method as defined in claim 25 wherein the surface treatment is followed by a leather finishing treatment applied to the external surface of said material.

References Cited

UNITED STATES PATENTS

| | | | |
|---|---|---|---|
| 656,869 | 8/1900 | Walden | 117—33 |
| 3,282,721 | 11/1966 | Iseki | 161—64X |
| 2,715,074 | 8/1955 | Hirschberger | 161—64 |

FOREIGN PATENTS

| | | | |
|---|---|---|---|
| 272 | 1866 | Great Britain | 117—33 |
| 570,891 | 2/1959 | Canada | 161—64 |

WILLIAM A. POWELL, Primary Examiner

U.S. Cl. X.R.

117—17, 25, 33, 93.4; 156—72, 279; 161—67, 158, 159, 162, 164, 165